(12) United States Patent
Eslami

(10) Patent No.: US 9,380,303 B1
(45) Date of Patent: Jun. 28, 2016

(54) ADDING RUN-MODE TO BLOCK-BASED DPCM CODEC

(71) Applicant: SONY CORPORATION, Tokyo (JP)

(72) Inventor: Ramin Eslami, Milpitas, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/661,818

(22) Filed: Mar. 18, 2015

(51) Int. Cl.
| | |
|---|---|
| G06K 9/36 | (2006.01) |
| H04N 19/10 | (2014.01) |
| H04N 19/105 | (2014.01) |
| H04N 19/124 | (2014.01) |
| H04N 19/13 | (2014.01) |
| H04N 19/102 | (2014.01) |
| H04N 19/149 | (2014.01) |
| H04N 19/182 | (2014.01) |
| H04N 19/184 | (2014.01) |
| H04N 19/91 | (2014.01) |
| H04N 19/93 | (2014.01) |
| H04N 19/176 | (2014.01) |
| H04N 19/40 | (2014.01) |

(52) U.S. Cl.
CPC ............. *H04N 19/10* (2014.11); *H04N 19/102* (2014.11); *H04N 19/105* (2014.11); *H04N 19/124* (2014.11); *H04N 19/13* (2014.11); *H04N 19/149* (2014.11); *H04N 19/176* (2014.11); *H04N 19/182* (2014.11); *H04N 19/184* (2014.11); *H04N 19/40* (2014.11); *H04N 19/91* (2014.11); *H04N 19/93* (2014.11)

(58) Field of Classification Search
None
See application file for complete search history.

(56) References Cited

U.S. PATENT DOCUMENTS

| 6,100,826 | A | * | 8/2000 | Jeon | ................. | H03M 7/46 341/59 |
|---|---|---|---|---|---|---|
| 6,614,847 | B1 | * | 9/2003 | Das | ................. | H04N 19/537 375/240.15 |
| 2005/0232501 | A1 | * | 10/2005 | Mukerjee | ................. | H04N 19/105 382/239 |
| 2011/0033126 | A1 | * | 2/2011 | Liu | ................. | H04N 19/176 382/238 |
| 2013/0251032 | A1 | * | 9/2013 | Tanaka | ................. | H04N 19/44 375/240.03 |
| 2014/0301462 | A1 | * | 10/2014 | Gu | ................. | H04N 19/159 375/240.12 |

* cited by examiner

*Primary Examiner* — Li Liu
(74) *Attorney, Agent, or Firm* — O'Banion & Ritchey LLP; John P. O'Banion

(57) ABSTRACT

Embedded differential pulse code modulation (DPCM) is performed in response to coding locations of DPCM non-zero residuals during entropy coding utilizing adaptive run-length (ARL) coding. In this manner the need to code zero residuals is eliminated. After adaptive run-length coding, the non-zero residuals are coded in the regular mode, such as utilizing exponential Golomb coding. Overall compression is improved for blocks containing any significant number of zeros.

20 Claims, 3 Drawing Sheets

FIG. 1
(Prior Art)

| index | Y | n=7 (MSB) | n=6 | n=5 | n=4 | n=3 | n=2 | n=1 | n=0 (LSB) |
|---|---|---|---|---|---|---|---|---|---|
| 0 | 55 | 0 | 0 | 1 | 1 | 0 | 1 | 1 | 1 |
| 1 | 19 | 0 | 0 | 0 | 1 | 0 | 0 | 1 | 1 |
| 2 | 60 | 0 | 0 | 1 | 1 | 1 | 1 | 0 | 0 |
| 3 | 40 | 0 | 0 | 1 | 0 | 1 | 0 | 0 | 0 |
| 4 | 183 | 1 | 0 | 1 | 1 | 0 | 1 | 1 | 1 |
| 5 | 255 | 1 | 1 | 1 | 1 | 1 | 1 | 1 | 1 |
| 6 | 100 | 0 | 1 | 1 | 0 | 0 | 1 | 0 | 0 |
| 7 | 5 | 0 | 0 | 0 | 0 | 0 | 1 | 0 | 1 |
| 8 | 161 | 1 | 0 | 1 | 0 | 0 | 0 | 0 | 1 |
| 9 | 45 | 0 | 0 | 1 | 0 | 1 | 1 | 0 | 1 |
| 10 | 150 | 1 | 0 | 0 | 1 | 0 | 1 | 1 | 0 |
| 11 | 135 | 1 | 0 | 0 | 0 | 0 | 1 | 1 | 1 |
| 12 | 87 | 0 | 1 | 0 | 1 | 0 | 1 | 1 | 1 |
| 13 | 183 | 1 | 0 | 1 | 1 | 0 | 1 | 1 | 1 |
| 14 | 89 | 0 | 1 | 0 | 1 | 1 | 0 | 0 | 1 |
| 15 | 139 | 1 | 0 | 0 | 0 | 1 | 0 | 1 | 1 |
| 16 | 119 | 0 | 1 | 1 | 1 | 0 | 1 | 1 | 1 |
| 17 | 3 | 0 | 0 | 0 | 0 | 0 | 0 | 1 | 1 |
| 18 | 33 | 0 | 0 | 1 | 0 | 0 | 0 | 0 | 1 |
| 19 | 178 | 1 | 0 | 1 | 1 | 0 | 0 | 1 | 0 |
| 20 | 102 | 0 | 1 | 1 | 0 | 0 | 1 | 1 | 0 |
| 21 | 56 | 0 | 0 | 1 | 1 | 1 | 0 | 0 | 0 |
| 22 | 28 | 0 | 0 | 0 | 1 | 1 | 1 | 0 | 0 |
| 23 | 110 | 0 | 1 | 1 | 0 | 1 | 1 | 1 | 0 |
| 24 | 76 | 0 | 1 | 0 | 0 | 1 | 1 | 0 | 0 |
| 25 | 163 | 1 | 0 | 1 | 0 | 0 | 0 | 1 | 1 |
| 26 | 21 | 0 | 0 | 0 | 1 | 0 | 1 | 0 | 1 |
| 27 | 21 | 0 | 0 | 0 | 1 | 0 | 1 | 0 | 1 |
| 28 | 205 | 1 | 1 | 0 | 0 | 1 | 1 | 0 | 1 |
| 29 | 189 | 1 | 0 | 1 | 1 | 1 | 1 | 0 | 1 |
| 30 | 98 | 0 | 1 | 1 | 0 | 0 | 0 | 1 | 0 |
| 31 | 252 | 1 | 1 | 1 | 1 | 1 | 1 | 0 | 0 |

US 9,380,303 B1

ADDING RUN-MODE TO BLOCK-BASED DPCM CODEC

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This disclosure pertains generally to embedded image coding, and more particularly to embedded image coding in which adaptive run length coding is utilized during entropy coding and followed by a regular entropy coding technique.

2. Background Discussion

Embedded block image coding provides a significant benefit of allowing coding to be performed in a random access manner. That is to say that blocks do not have to be decoded in a particular sequence which relies on information from previous coding blocks. Among the additional benefits of embedded image codecs are a reduction in memory bandwidth while providing visually lossless results. Toward achieving this random access ability, images for embedded coding are divided into small one-dimensional blocks. Ongoing improvements are always sought for improving image coding efficiency for embedded image coding.

Accordingly, the present disclosure can provide increased compression efficiency, and overcome shortcomings of previous solutions.

BRIEF SUMMARY

Embedded block coding is improved in the presented technology by coding the location of DPCM non-zero residuals during entropy coding utilizing adaptive run-length (ARL) coding. In this manner the need to code zero residuals is eliminated. After adaptive run-length coding, the non-zero residuals (within the ARL coding stream) are coded in the regular mode, such as utilizing exponential Golomb coding. The term "regular mode" or "regular coding", herein refers to the use of any desired entropy coding technique to which the ARL coding of non-zero residuals according to the present disclosure is being combined. Overall compression is improved for blocks containing any significant number of zeros.

Further aspects of the disclosure will be brought out in the following portions of the specification, wherein the detailed description is for the purpose of fully disclosing preferred embodiments of the disclosure without placing limitations thereon.

BRIEF DESCRIPTION OF THE SEVERAL VIEWS OF THE DRAWING(S)

The disclosure will be more fully understood by reference to the following drawings which are for illustrative purposes only:

FIG. 1 is a diagram of a one-dimensional image block, such as utilized for embedded image coding.

DETAILED DESCRIPTION

Apparatus and methods of the present disclosure utilize a different process of entropy coding to enhance compression efficiency. It will be recognized that embedded coding performs pulse code modulation (PCM), or differential pulse code modulation (DPCM) coding followed by entropy coding, for each of the blocks to be coded in the image.

FIG. 1 depicts an example block of size 32×1 for a color component (for example "Y" in a YCbCr image) as part of a one-dimensional image block used for embedded coding of image pixels. The figure shows pixel value for this color component along the top row above an index, and followed beneath by the most significant bit (MSB) and on down through a least significant bit (LSB). The pixel value is herein exemplified herein with 8 bit words (n=0-7). In coding the blocks, each block is compressed within a selected bit budget.

The general process of coding of an image block is performed by selecting the use of either pulse code modulation (PCM), or differential pulse code modulation (DPCM) and entropy coding. Although DPCM coding is the principle form of compression performed, for some blocks PCM coding needs to be performed.

In PCM mode, bits are sent in a bitplane-by-bitplane manner from MSB (most-significant bit) to LSB (least-significant bit) until the extent of the bit budget is reached. Obviously, spatial and temporal prediction which spans beyond the block (e.g., intra-frame and inter-frame predictions) are not performed as this would create a bitstream having inter-dependent block coding.

In DPCM mode there is a prediction performed, based on prior pixel value, and the residual is entropy coded. DPCM coding is the primary coding form of embedded coding, and is coded at different quantization levels depending on tradeoffs between image accuracy and bit budget constraints.

Figure 2:
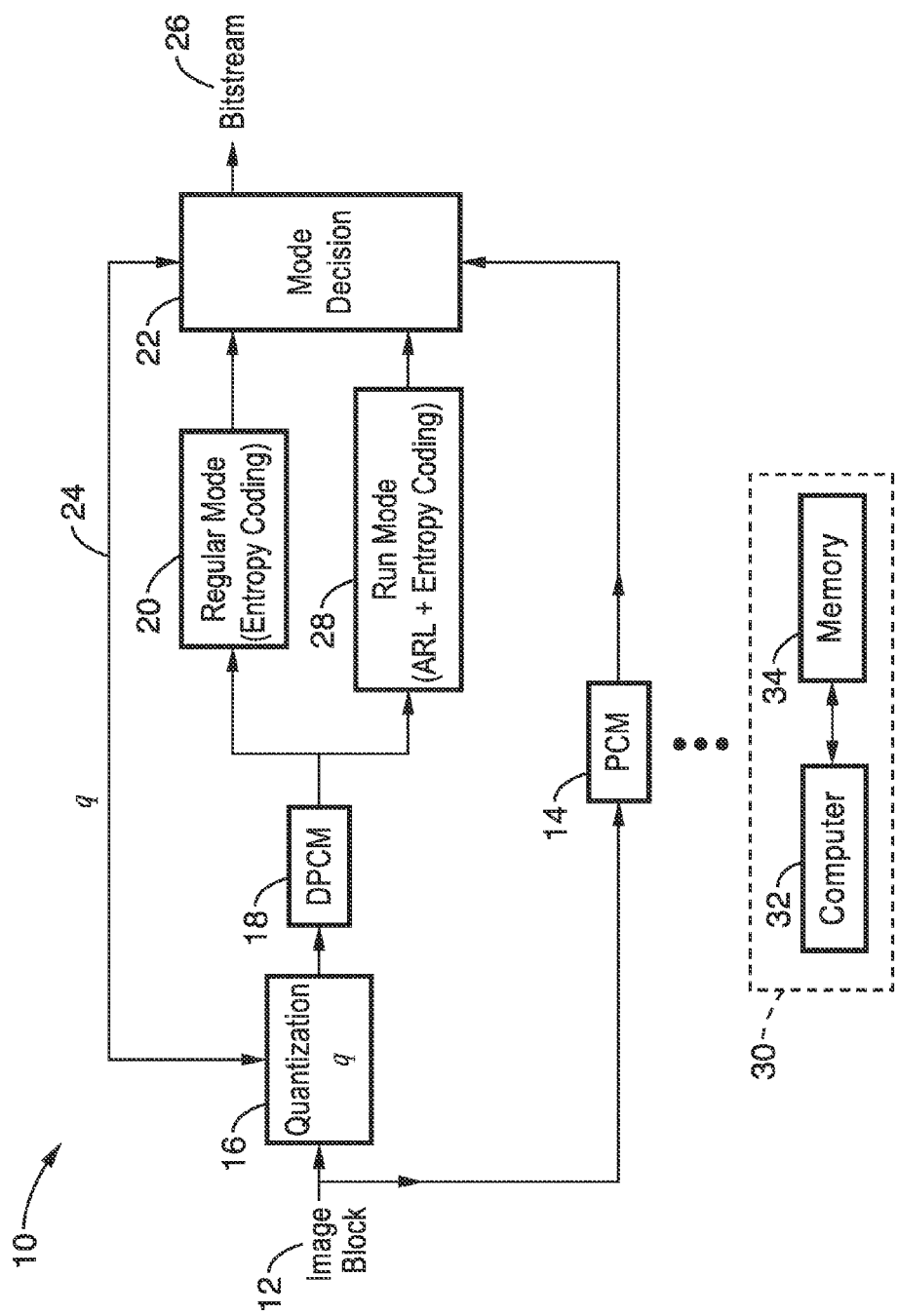
FIG. 2 is a block diagram of embedded image coding according to an embodiment of the disclosed technology, showing DPCM entropy coding enhanced by ARL coding of non-zero residual locations.

FIG. 2 illustrates an example embodiment 10 of embedded coding according to the present disclosure. An image block 12 is received for PCM coding 14, or DPCM coding involving quantization 16, and actual DPCM coding 18. After DPCM coding 18, the residuals are coded in two modes: non-run mode (or regular mode) 20, and run mode 28. The output of both are fed into the mode decision block 22, which determines whether PCM or DPCM is utilized as well as selecting 24 the quantization level for DPCM coding, before outputting 26 the coded bitstream. Finding a correct, preferably optimum, quantization value, q, allows for maintaining a desired bitstream size within the bit budget for efficient coding performance.

After quantization of image block samples, DPCM coding finds spatial error by subtracting each sample from its prediction, and more particularly its prediction from the previous sample. The first sample is coded in PCM, that is to say it is coded as it is without spatial prediction and associated spatial error. After DPCM coding 18, entropy coding of spatial error is utilized to compute the compressed bitstream.

Instead of relying on the regular form of entropy coding (e.g., Golomb coding or others), the presented technology adds an adaptive run length (ARL) coding 28 to code the position (location) of non-zero residual whose values are coded by the regular entropy coding mode. Including this additional layer of entropy coding can increase coding efficiency for some blocks by eliminating the need to code runs of zeros.

The apparatus can be embodied utilizing different types of digital electronic circuitry, including forms of digital electronic circuit hardware, such as application specific integrated circuit (ASIC), field-programmable gate array (FPGA) on a system-on-chip (SOC), or other digital circuits and combinations thereof. Alternatively, or in combination with the digital circuits, a computer processor and associated programming executable on the computer processor can be utilized for carrying out the adaptive augmenting and coding of the locations.

A digital electronic circuit 30 is shown in the figure for performing the disclosed embedded encoding. By way of simple example this circuit can comprise at least one computer processor 32 and its associated programming stored in at least one memory 34 for executing programming for performing embedded coding for the disclosed technology. It will be appreciated that programming stored on memory 34, which includes solid state memory and computer-readable media, is executable on computer processor 32. The present disclosure is non-limiting with regard to memory and computer-readable media, insofar as these are non-transitory, and thus not constituting a transitory electronic signal.

It will be appreciated that run-length coding, which is a form of Golomb code, having parameter $m=2^k$, is given as follows. Runs of m zeros (0) are coded with a zero (0). Sequences of the form [p is the number of zeros]:

$$\underbrace{00\ldots01}_{p<m}$$

are coded with:

$$1\underbrace{xx\ldots x}_{k\ bits}$$

with these k bits being a binary representation of p. An example is with m=4 the sequence 001000001000 is coded as 110 0 101 0, thus representing in 8 bits what previously required 12 bits.

Consider adaptive run-length coding (or adaptive binary Golomb code) with initial parameter $m_0=1$. Increase m as m=2 m if a run of m zeros is received; and decrease m as m=m/2 if the run of zeros is less than m.

Figure 3:
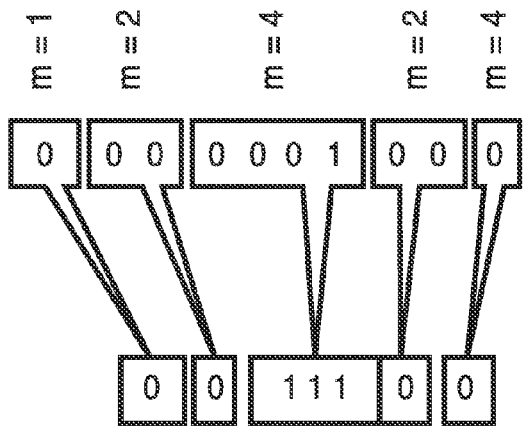
FIG. 3 is a coding diagram showing adaptive run length coding of a first sequence, into a second sequence.

FIG. 3 depicts an example with $m_0=1$, showing the sequence, over which is seen the m values, and resultant code at the bottom.

In this disclosure, an adaptive run length (ARL) coding mode is added to the DPCM mode in the block-based DPCM codec for coding the location of non-zero residuals. A decision is made on which mode (run mode/non-run mode) to choose for each qn. This decision is made by comparing different candidates at the Mode Decision step (22 at FIG. 2). By way of example and not limitation, one simple manner of making this decision is counting the number of bits that are compressed, and deciding the mode that needs the smaller number of bits to be coded. Then the bits corresponding to the chosen mode is packed into the bitstream and the selected mode (run mode/non-run mode) is signaled with 1 bit in the bitstream header.

For using the additional adaptive run-length mode, the presented technology first computes the significance map of the residuals in the block. For example, using 1 for non-zero residuals and 0 for the zero residuals. Then using adaptive run-length coding to code the significance map. In adaptive run-length coding, when a non-zero residual is received, the residual value minus one is coded with the entropy code that is used in the regular mode (e.g., exponential Golomb).

Consider the following example of an 8×1 block: 0, −1, 0, 0, 0−2, 0, 0. After mapping to positive numbers the value 1, 2, 1, 1, 1, 4, 1, 1 is arrived at. Then this value is entropy coded using the regular mode, such as exemplifier herein as using exponential. Golomb coding, into the value 1 010 1 1 1 00100 1 1. The significance map for this bit sequence is 01000100. Using adaptive run-length coding with initial m=1 we obtain location information for non-zero residuals as 0 10 0 0 100 0 with m values as 1 2 1 2 4 2. Now the run length code, indicating non-zero residuals is combined with the regular entropy coding, to code the actual non-zero residuals-1, such as by exponential Golomb coding, yielding the result 0 10 1 0 0 100 011 0, with the underlined bits showing the combined regular coding added in. The example illustrates that use of an adaptive run-length coding mode combined with the regular entropy coding saved 1 bit over the use of the regular entropy coding mode by itself.

Figure 4:
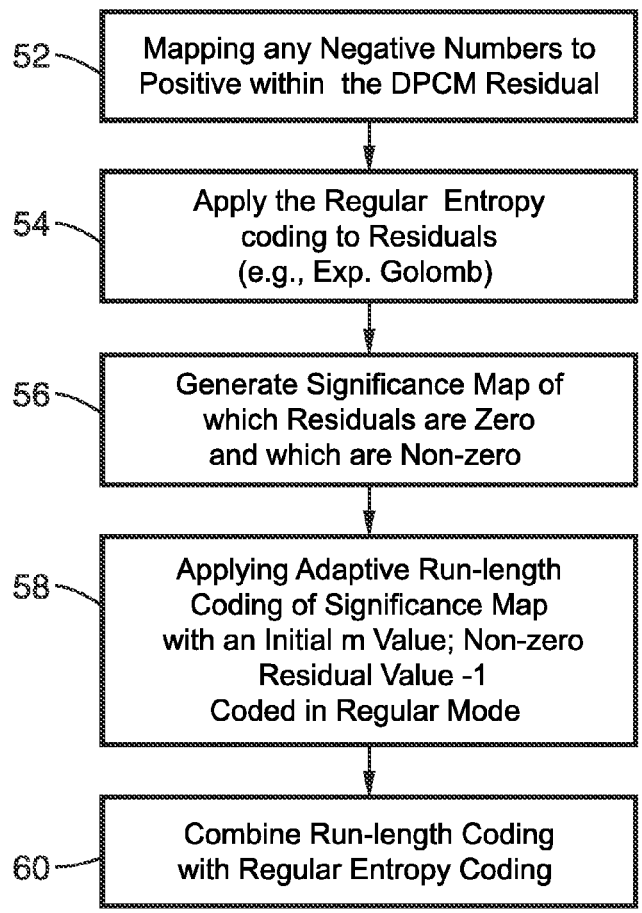
FIG. 4 is a flow diagram of performing embedded image coding steps according to an embodiment of the disclosed technology.

FIG. 4 illustrates an example embodiment 50 of adding this adaptive run-length coding mode to regular entropy coding in the DPCM coding process. In particular, the figure describes the steps in block 28 of FIG. 2. Any negative numbers are mapped to positive 52 within the DPCM residual. Regular entropy coding is applied 54, as exemplified herein using exponential Golomb coding. A significance map is generated 56, indicating which residuals are zero and which are non-zero. Adaptive run-length (ARL) coding is applied 58 to the significance map with a selected initial m value, so that the non-zero residual value −1 is coded in the regular mode. Then the adaptive run-length coding is combined 60 with the regular entropy coding which codes the non-zero residuals. There is no need to code the zero residuals as the ARL coding indicated these already. Each of the above steps being preferably carried out by programming stored in a memory for execution on a computer processor within an embedded image encoder. It will be appreciated that this distinguishing between the run and non-run mode can be performed in numerous different ways, such as described above, or utilizing flagging which mode to use and so forth.

At the decoder, first the chosen mode (run or non-run) for the block is decoded from the bitstream header. Then accordingly the residuals are decoded from the bitstream using the chosen mode, which is followed by the reconstruction of pixel values from the residuals.

Embodiments of the present disclosure may be described with reference to flowchart illustrations of methods and systems according to embodiments of the disclosure, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for embedded entropy coding of residuals from differential pulse code modulation in an image encoder, comprising: (a) an image coding device configured for selecting between pulse code modulation (PCM) and differential pulse code modulation (DPCM) for coding image blocks within an image being coded; (b) an electronic circuit in said entropy coding device, said electronic circuit configured for adaptively augmenting regular entropy coding of differential pulse code modulation (DPCM) residuals by applying adaptive run-length (ARL) coding; (c) wherein said electronic circuit is configured to use ARL to code the locations of non-zero residuals, with values being coded using a regular entropy coding process; and (d) outputting an embedded entropy-coded bitstream configured for subsequent decoding and display.

2. The apparatus of any preceding embodiment, wherein regular coding comprises any desired entropy coding technique to which ARL coding of non-zero residuals is combined.

3. The apparatus of any preceding embodiment, wherein said electronic circuit is configured to selectively utilize adaptive run-length (ARL) coding to eliminate coding of zero residuals.

4. The apparatus of any preceding embodiment, wherein said apparatus provides improvements in overall compression for blocks containing any significant number of zeros.

5. The apparatus of any preceding embodiment, wherein said embedded image coding allows coding to be performed in a random access manner, in which blocks are not required to be coded in a particular sequence relying on information from previous blocks.

6. The apparatus of any preceding embodiment, wherein said image blocks comprise one-dimensional image blocks.

7. The apparatus of any preceding embodiment, wherein said electronic circuit is selected from the group of electronic hardware consisting of application specific integrated circuit (ASIC), field-programmable gate array (FPGA) on a system-on-chip (SOC).

8. The apparatus of any preceding embodiment, wherein said electronic circuit comprises a computer processor and associated programming executable on the computer processor for carrying out adaptive augmenting and coding of the locations.

9. The apparatus of any preceding embodiment, wherein said apparatus is configured to perform embedded image coding in which adaptive run length (ARL) coding is utilized during entropy coding and followed by a regular entropy coding technique.

10. An apparatus for embedded entropy coding of residuals from differential pulse code modulation in an image encoder, comprising: (a) an image coding device configured for selecting between pulse code modulation (PCM) and differential pulse code modulation (DPCM) for coding image blocks within an image being coded; (b) an electronic circuit in said entropy coding device, said electronic circuit configured for adaptively augmenting regular entropy coding of differential pulse code modulation (DPCM) residuals by applying adaptive run-length (ARL) coding; (c) wherein upon selecting run mode with ARL, entropy coding is performing in response to: (c)(i) mapping any negative numbers in differential pulse code modulation (DPCM) residual to positive values, (c)(ii) applying a regular entropy coding process to DPCM residuals, (c)(iii) generating a significance map of which residuals are zero and which are non-zero, (c)(iv) applying a adaptive run-length (ARL) coding process to said significance map with non-zero residuals entropy coded by regular entropy coding, and (c)(v) combining ARL coding with the regular entropy coding; and (d) outputting an embedded entropy-coded bitstream configured for subsequent decoding and display.

11. The apparatus of any preceding embodiment, wherein regular coding comprises any desired entropy coding technique to which ARL coding of non-zero residuals is combined.

12. The apparatus of any preceding embodiment, wherein said electronic circuit is configured to selectively utilize adaptive run-length (ARL) coding to eliminate coding of zero residuals.

13. The apparatus of any preceding embodiment, wherein said apparatus provides improvements in overall compression for blocks containing any significant number of zeros.

14. The apparatus of any preceding embodiment, wherein said embedded image coding allows coding to be performed in a random access manner, in which blocks are not required to be coded in a particular sequence relying on information from previous blocks.

15. The apparatus of any preceding embodiment, wherein said image blocks comprise one-dimensional image blocks.

16. The apparatus of any preceding embodiment, wherein said electronic circuit is selected from the group of electronic hardware consisting of application specific integrated circuit (ASIC), field-programmable gate array (FPGA) on a system-on-chip (SOC).

17. The apparatus of any preceding embodiment, wherein said electronic circuit comprises a computer processor and associated programming executable on the computer processor for carrying out adaptive augmenting and coding.

18. The apparatus of any preceding embodiment, wherein said apparatus is configured to perform embedded image coding in which adaptive run length (ARL) coding is utilized during entropy coding and followed by a regular entropy coding technique.

19. A method of embedded entropy coding of residuals from differential pulse code modulation in an image encoder, comprising: (a) mapping any negative numbers in a differential pulse code modulation (DPCM) residual to positive values within an image encoder configured for performing embedded entropy coding; (b) applying a regular entropy coding process to DPCM residuals; (c) generating a significance map of which residuals are zero and non-zero; (d) applying an adaptive run-length (ARL) coding process to said significance map, with non-zero residuals entropy coded by the regular mode; (e) combining ARL coding with the regular entropy coding; and (f) outputting an embedded entropy-coded bitstream configured for subsequent decoding and display.

20. The method of any preceding embodiment, wherein said embedded image coding allows coding to be performed in a random access manner, in which blocks are not required to be coded in a particular sequence relying on information from previous blocks, while selecting adaptive run-length (ARL) coding to eliminate coding of zero residuals improves overall compression for blocks containing any significant number of zeros.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for embedded entropy coding of residuals from differential pulse code modulation in an image encoder, comprising:
   (a) an image coding device configured for selecting between pulse code modulation (PCM) and differential pulse code modulation (DPCM) for coding image blocks within an image being coded;
   (b) an electronic circuit in said entropy coding device, said electronic circuit configured for adaptively augmenting regular entropy coding of differential pulse code modulation (DPCM) residuals by applying adaptive run-length (ARL) coding;
   (c) wherein said electronic circuit is configured to use ARL to code the locations of non-zero residuals, with values being coded using a regular entropy coding process; and
   (d) outputting an embedded entropy-coded bitstream configured for subsequent decoding and display.

2. The apparatus as recited in claim 1, wherein regular coding comprises any desired entropy coding technique to which ARL coding of non-zero residuals is combined.

3. The apparatus as recited in claim 1, wherein said electronic circuit is configured to selectively utilize adaptive run-length (ARL) coding to eliminate coding of zero residuals.

4. The apparatus as recited in claim 3, wherein said apparatus provides improvements in overall compression for blocks containing any significant number of zeros.

5. The apparatus as recited in claim 1, wherein said embedded image coding allows coding to be performed in a random access manner, in which blocks are not required to be coded in a particular sequence relying on information from previous blocks.

6. The apparatus as recited in claim 1, wherein said image blocks comprise one-dimensional image blocks.

7. The apparatus as recited in claim 1, wherein said electronic circuit is selected from the group of electronic hardware consisting of application specific integrated circuit (ASIC), field-programmable gate array (FPGA) on a system-on-chip (SOC).

8. The apparatus as recited in claim 1, wherein said electronic circuit comprises a computer processor and associated programming executable on the computer processor for carrying out adaptive augmenting and coding of the locations.

9. The apparatus as recited in claim 1, wherein said apparatus is configured to perform embedded image coding in which adaptive run length (ARL) coding is utilized during entropy coding and followed by a regular entropy coding technique.

10. An apparatus for embedded entropy coding of residuals from differential pulse code modulation in an image encoder, comprising:
   (a) an image coding device configured for selecting between pulse code modulation (PCM) and differential pulse code modulation (DPCM) for coding image blocks within an image being coded;
   (b) an electronic circuit in said entropy coding device, said electronic circuit configured for adaptively augmenting regular entropy coding of differential pulse code modulation (DPCM) residuals by applying adaptive run-length (ARL) coding;
   (c) wherein upon selecting run mode with ARL, entropy coding is performing in response to: (i) mapping any negative numbers in differential pulse code modulation (DPCM) residual to positive values, (ii) applying a regular entropy coding process to DPCM residuals, (iii) generating a significance map of which residuals are zero and which are non-zero, (iv) applying a adaptive run-length (ARL) coding process to said significance map with non-zero residuals entropy coded by regular entropy coding, and (v) combining ARL coding with the regular entropy coding; and
   (d) outputting an embedded entropy-coded bitstream configured for subsequent decoding and display.

11. The apparatus as recited in claim 10, wherein regular coding comprises any desired entropy coding technique to which ARL coding of non-zero residuals is combined.

12. The apparatus as recited in claim 10, wherein said electronic circuit is configured to selectively utilize adaptive run-length (ARL) coding to eliminate coding of zero residuals.

13. The apparatus as recited in claim 12, wherein said apparatus provides improvements in overall compression for blocks containing any significant number of zeros.

14. The apparatus as recited in claim 10, wherein said embedded image coding allows coding to be performed in a random access manner, in which blocks are not required to be coded in a particular sequence relying on information from previous blocks.

15. The apparatus as recited in claim 10, wherein said image blocks comprise one-dimensional image blocks.

16. The apparatus as recited in claim 10, wherein said electronic circuit is selected from the group of electronic hardware consisting of application specific integrated circuit (ASIC), field-programmable gate array (FPGA) on a system-on-chip (SOC).

17. The apparatus as recited in claim 10, wherein said electronic circuit comprises a computer processor and associated programming executable on the computer processor for carrying out adaptive augmenting and coding.

18. The apparatus as recited in claim 10, wherein said apparatus is configured to perform embedded image coding in which adaptive run length (ARL) coding is utilized during entropy coding and followed by a regular entropy coding technique.

19. A method of embedded entropy coding of residuals from differential pulse code modulation in an image encoder, comprising:
   (a) mapping any negative numbers in a differential pulse code modulation (DPCM) residual to positive values within an image encoder configured for performing embedded entropy coding;
   (b) applying a regular entropy coding process to DPCM residuals;
   (c) generating a significance map of which residuals are zero and non-zero;
   (d) applying an adaptive run-length (ARL) coding process to said significance map, with non-zero residuals entropy coded by the regular mode;
   (e) combining ARL coding with the regular entropy coding; and
   (f) outputting an embedded entropy-coded bitstream configured for subsequent decoding and display.

20. The method as recited in claim 19, wherein said embedded image coding allows coding to be performed in a random access manner, in which blocks are not required to be coded in a particular sequence relying on information from previous blocks, while selecting adaptive run-length (ARL) coding to eliminate coding of zero residuals improves overall compression for blocks containing any significant number of zeros.

* * * * *